US012650918B2

(12) United States Patent
Agarwal et al.

(10) Patent No.: US 12,650,918 B2
(45) Date of Patent: Jun. 9, 2026

(54) HIGH PERFORMANCE MEMORY ALLOCATOR

(71) Applicant: Google LLC, Mountain View, CA (US)

(72) Inventors: Abhishek Agarwal, Santa Clara, CA (US); Srinivas Vaduvatha, San Jose, CA (US); Weiwei Jiang, Santa Clara, CA (US); Hugh McEvoy Walsh, Los Gatos, CA (US); Weihuang Wang, Los Gatos, CA (US); Jiazhen Zheng, Santa Clara, CA (US); Ajay Venkatesan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 330 days.

(21) Appl. No.: 17/954,540

(22) Filed: Sep. 28, 2022

(65) Prior Publication Data

US 2024/0111667 A1     Apr. 4, 2024

(51) Int. Cl.
*G06F 12/02* (2006.01)
*G06F 12/06* (2006.01)

(52) U.S. Cl.
CPC ........ *G06F 12/023* (2013.01); *G06F 12/0292* (2013.01); *G06F 12/0607* (2013.01)

(58) Field of Classification Search
CPC . G06F 12/023; G06F 12/0292; G06F 12/0607
USPC ................................. 711/171, 170
See application file for complete search history.

(56) References Cited

U.S. PATENT DOCUMENTS

| | | | |
|---|---|---|---|
| 7,363,456 B2 | 4/2008 | Fleming et al. | |
| 7,472,233 B2 | 12/2008 | McKenney et al. | |
| 7,809,918 B1 | 10/2010 | Samuel | |
| 10,019,288 B2 | 7/2018 | Kung et al. | |
| 10,469,252 B2 | 11/2019 | Schmisseur et al. | |
| 10,540,093 B2 | 1/2020 | Leidel et al. | |
| 10,915,245 B2 | 2/2021 | Stabrawa et al. | |
| 11,159,651 B2 | 10/2021 | Masputra et al. | |
| 11,360,679 B2 | 6/2022 | Stabrawa et al. | |
| 2003/0163609 A1* | 8/2003 | Abdo .................... | G06F 3/0659 710/5 |
| 2005/0055526 A1 | 3/2005 | Challenger et al. | |
| 2008/0104353 A1 | 5/2008 | Madisetti | |
| 2014/0089625 A1* | 3/2014 | Assarpour ............. | G06F 12/023 711/170 |
| 2021/0185139 A1 | 6/2021 | Wang et al. | |

OTHER PUBLICATIONS

Extended European Search Report for European Patent Application No. 23155272.0 dated Sep. 8, 2023. 7 pages.

* cited by examiner

*Primary Examiner* — Hosain T Alam
*Assistant Examiner* — Zubair Ahmed
(74) *Attorney, Agent, or Firm* — Lerner David LLP

(57) ABSTRACT

Aspects of the disclosure are directed to a memory allocator for assigning contiguous memory space for data packets in on-chip memory of a network interface card. The memory allocator includes a plurality of sub-allocators that correspond to a structure of entries, where each entry represents a quanta of memory allocation. The sub-allocators are organized in decreasing size in the memory allocator based on the amount of memory quanta they can allocate.

20 Claims, 7 Drawing Sheets

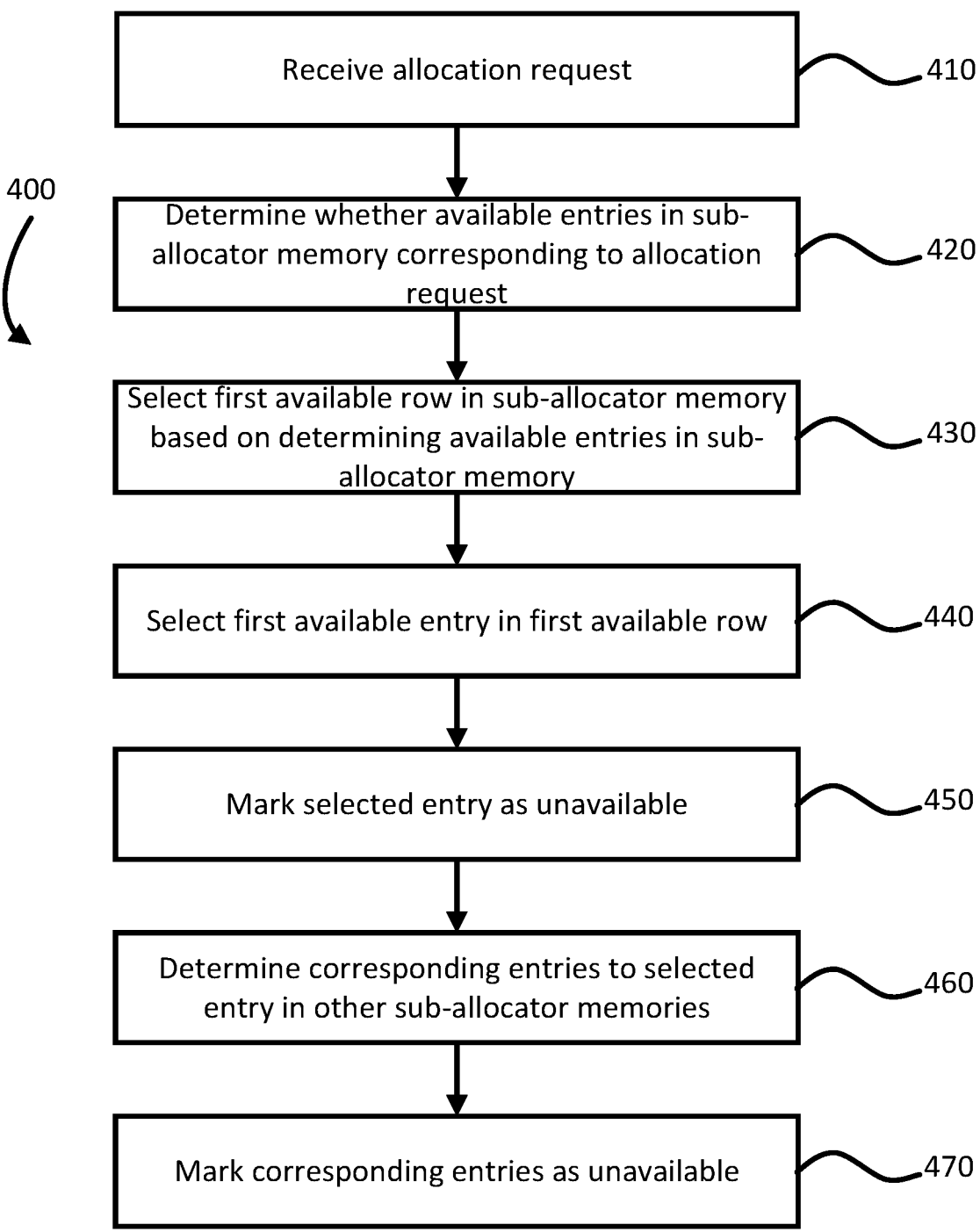

400

| Receive allocation request | 410 |

| Determine whether available entries in sub-allocator memory corresponding to allocation request | 420 |

| Select first available row in sub-allocator memory based on determining available entries in sub-allocator memory | 430 |

| Select first available entry in first available row | 440 |

| Mark selected entry as unavailable | 450 |

| Determine corresponding entries to selected entry in other sub-allocator memories | 460 |

| Mark corresponding entries as unavailable | 470 |

Receive deallocation request —610

Select entry to be deallocated based on cell address in deallocation request —620

Mark determined entry as available —630

Determine corresponding entries to selected entry in other sub-allocator memories —640

Mark corresponding entries as available —650

HIGH PERFORMANCE MEMORY ALLOCATOR

BACKGROUND

Memory space related to data packet transmission over a network can be allocated in granularity of cells, with support for an amount of cells in the memory. For example, cell sizes can be configured as 256B, 512B, or 1 KB with support for up to 512K cells. A data packet can include a single control cell, which stores metadata for the data packet, and a plurality of data cells. Depending on the data packet size, multiple data cells in the memory may need to be allocated to the data packet. However, allocating cells non-continuously can result in larger read latency since the control cell would have to be fetched prior to issuing a read for the data cells, since the control cell would contain addresses for the data cells.

BRIEF SUMMARY

Aspects of the disclosure are directed to a memory allocator for assigning contiguous memory space for data packets in on-chip memory of a network interface card. The memory allocator includes a plurality of sub-allocators that correspond to a structure of entries, where each entry represents a quanta of memory allocation. The sub-allocators are organized in decreasing size in the memory allocator based on the amount of memory quanta they can allocate.

An aspect of the disclosure provides for a method for assigning contiguous memory space for data packets. The method includes: receiving, with one or more processors, an allocation request to assign a number of continuous pointers to a sub-allocator memory of a plurality of sub-allocator memories; searching, with the one or more processors, for an available entry in a summary vector that corresponds to an available row in a sub-allocator memory; selecting, with the one or more processors, a row in a sub-allocator memory based on a first available entry in the summary vector; selecting, with the one or more processors, a first available entry in the selected row to provide addresses for the number of continuous pointers; and marking, with the one or more processors, the selected entry as unavailable.

In an example, the method further includes: determining, with the one or more processors, corresponding entries to the selected entry in other sub-allocator memories; and marking, with the one or more processors, the corresponding entries as unavailable. In another example, the method further includes resetting, with the one or more processors, entries in the summary vector based on the selected entry marked as unavailable and the corresponding entries marked as unavailable.

In yet another example, the summary vector being searched matches the number of continuous pointers. In yet another example, the number of continuous pointers corresponds to a number of cells in a data packet. In yet another example, the method further includes determining, with the one or more processors, the number of continuous pointers to assign based on an incoming allocation request size and a cell size.

In yet another example, the method further includes: receiving, with the one or more processors, a deallocation request to remove a pointer from an entry in a sub-allocator memory; and marking, with the one or more processors, the entry from which the pointer is being removed as available. In yet another example, the method further includes: determining, with the one or more processors, corresponding entries to the entry from which the pointer is being removed in other sub-allocator memories; and marking, with the one or more processors, the corresponding entries to the entry from which the pointer is being removed as available. In yet another example, allocation requests and deallocation requests are received in a round-robin fashion.

In yet another example, the plurality of sub-allocator memories are arranged in decreasing size based on a number of continuous cells each sub-allocator memory can support.

Another aspect of the disclosure provides for a system including: one or more processors; and one or more storage devices coupled to the one or more processors and storing instructions that, when executed by the one or more processors, cause the one or more processors to perform operations for assigning contiguous memory space for data packets. The operations include: receiving an allocation request to assign a number of continuous pointers to a sub-allocator memory of a plurality of sub-allocator memories; searching for an available entry in a summary vector that corresponds to an available row in a sub-allocator memory; selecting a row in a sub-allocator memory based on a first available entry in the summary vector; selecting a first available entry in the selected row to provide addresses for the number of continuous pointers; and marking the selected entry as unavailable.

In an example, the operations further include: determining corresponding entries to the selected entry in other sub-allocator memories; marking the corresponding entries as unavailable; and resetting entries in the summary vector based on the selected entry marked as unavailable and the corresponding entries marked as unavailable.

In another example, the summary vector being searched matches the number of continuous pointers. In yet another example, the number of continuous pointers corresponds to a number of cells in a data packet. In yet another example, the operations further comprise determining the number of continuous pointers to assign based on an incoming allocation request size and a cell size.

In yet another example, the operations further include: receiving a deallocation request to remove a pointer from an entry in a sub-allocator memory; marking the entry from which the pointer is being removed as available; determining corresponding entries to the entry from which the pointer is being removed in other sub-allocator memories; and marking the corresponding entries to the entry from which the pointer is being removed as available. In yet another example, allocation requests and deallocation requests are received in a round-robin fashion.

In yet another example, the plurality of sub-allocator memories are arranged in decreasing size based on a number of continuous cells each sub-allocator memory can support.

Yet another aspect of the disclosure provides for a non-transitory computer readable medium for storing instructions that, when executed by one or more processors, cause the one or more processors to perform operations for assigning contiguous memory space for data packets. The operations include: receiving an allocation request to assign a number of continuous pointers to a sub-allocator memory of a plurality of sub-allocator memories; searching for an available entry in a summary vector that corresponds to an available row in a sub-allocator memory; selecting a row in a sub-allocator memory based on a first available entry in the summary vector; selecting a first available entry in the selected row to provide addresses for the number of continuous pointers; and marking the selected entry as unavailable.

In an example, the operations further comprise: determining corresponding entries to the selected entry in other sub-allocator memories; marking the corresponding entries as unavailable; and resetting entries in the summary vector based on the selected entry marked as unavailable and the corresponding entries marked as unavailable.

BRIEF DESCRIPTION OF THE DRAWINGS

FIG. 4 depicts a flow diagram of an example process for allocating memory for an incoming data packet according to aspects of the disclosure.

DETAILED DESCRIPTION

Figure 1:
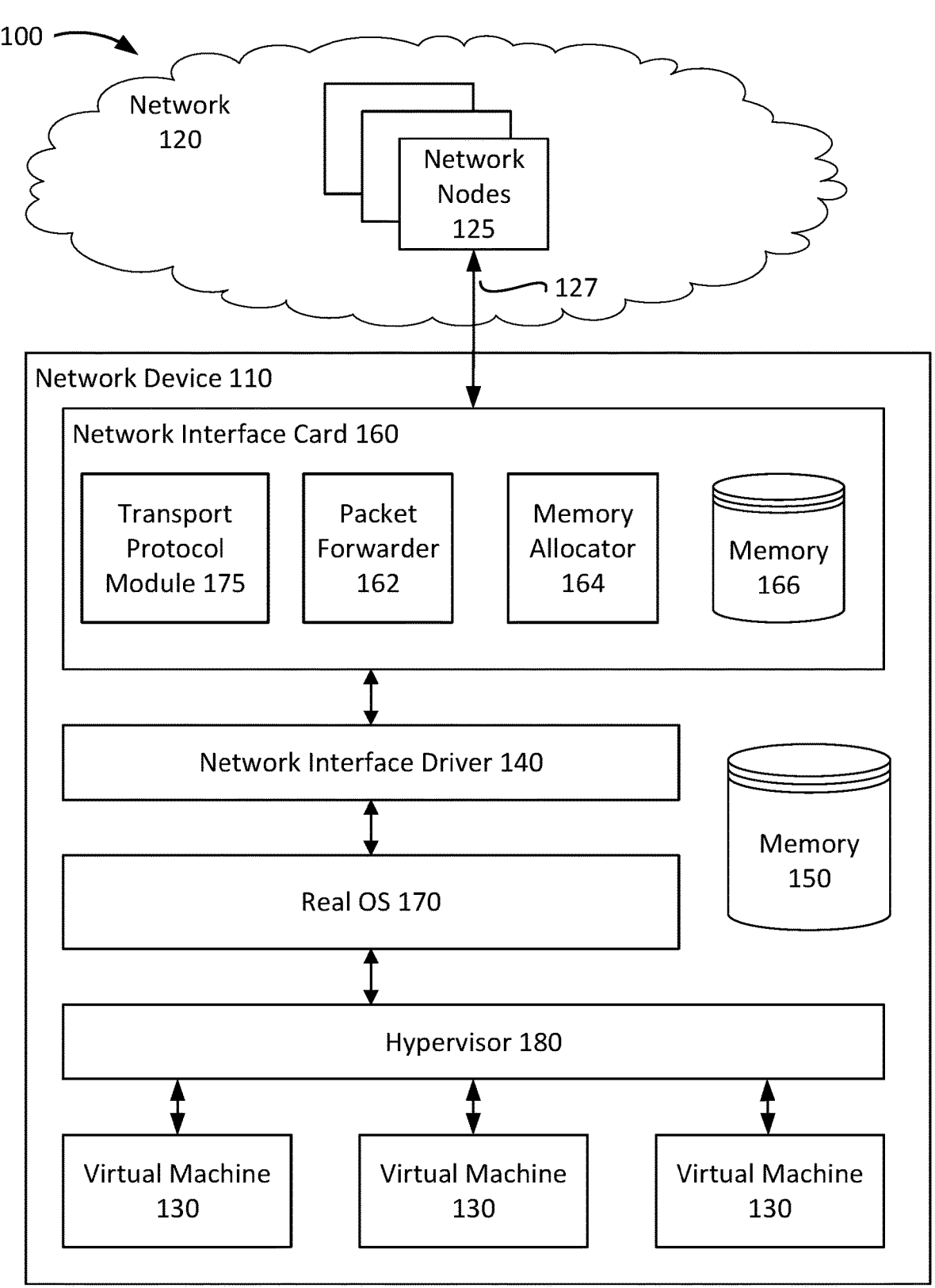
FIG. 1 depicts a block diagram of an example network environment with a network device according to aspects of the disclosure.

Generally disclosed herein are implementations for a memory allocator that can assign contiguous memory space for data packets in on-chip memory of a network interface card. The memory allocator includes a plurality of on-chip memory based free pool sub-allocators. The sub-allocators can correspond to a 2-dimensional structure of entries, such as rows and columns of bits, where each entry, e.g., bit, represents a quanta of memory allocation. The sub-allocators are organized in decreasing size in the memory allocator based on the amount of memory quanta they can allocate.

The memory allocator attempts to allocate all cells for a data packet in a continuous address range. Allocating the cells in a continuous address range eliminates the need to store an address for cells in a control cell of the data packets, thereby reducing fetch latency. While the memory allocator is described herein as allocating cells for a data packet, it should be noted that the memory allocator can also allocate pages for a data packet by converting page pointers to cell pointers based on adding a bit rate at the least significant bit of the page address.

The memory allocator allocates continuous cell pointers to incoming allocation requests. The number of cells, and thus the number of cell pointers, required for an incoming data packet can be computed based on an incoming allocation request size and a cell size configuration.

The computed number of continuous cell pointers can be output one cycle at a time on an allocation interface. If the computed number of continuous cell pointers are not available, the memory allocator can switch to a page allocation mode and assign non-continuous pointers. A deallocation interface can deallocate an assigned cell pointer based on a pointer address provided. Allocation and deallocation requests can be arbitrated in a round-robin fashion, with an allocation or deallocation supported per cycle.

To assign multiple continuous cell pointers, the memory allocator includes a number of sub-allocators, with each sub-allocator supporting a different number of continuous cells. Each sub-allocator can store an entry, such as a bit, for one set of continuous cells. The entries can be arranged in a structure, such as a 2-dimensional column/row structure, in on-chip memory. To keep track of available contiguous pointers, a memory can correspond to each sub-allocator. The sub-allocators can be organized in decreasing size in the memory allocator based on the amount of continuous cells they can support.

The memory allocator can further include a summary vector per sub-allocator to indicate which rows in memory have page pointers available to be allocated. The summary vectors can be kept in flops.

At reset or start, all entries in all the sub-allocator memories are set to being available for allocation. An incoming request is received to assign a number of continuous pointers. The memory allocator can attempt to find the best possible match for the request. The memory allocator first looks at the summary vector that matches the number of continuous pointers to find a row which has that number of continuous pointers available. If there are none available, indicated by the corresponding summary vector, the memory allocator can enter a non-continuous mode and assign the pointers using the lowest page memory. If there are rows available, the memory allocator can select a row by finding the first available entry in the summary vector. The first available entry in the summary vector can correspond to a lowest page sub-allocator memory. The memory allocator can read the memories for the selected row to select the first available entry in the selected row, to provide addresses for the number of continuous pointers. The memory allocator can mark the selected entry as unavailable. The memory allocator can also compute corresponding entries for other sub-allocator memories and mark those as unavailable as well. The memory allocator can recompute the row summary entries in the summary vectors for all sub-allocator memories and reset any entries if required.

The memory allocator can deallocate a pointer per cycle. The memory allocator can determine the row and column for deallocation based on an incoming address. The memory allocator can read all memories for the determined row and mark as available the entry in the sub-allocated memory to be deallocated. The memory allocator can also compute and set any corresponding entries as available for all other sub-allocator memories. The memory allocator can recompute the row summary entries in the summary vectors for all the sub-allocator memories and reset any entries if required. The memory allocator can receive a cell address to be deallocated. The memory allocator can wait until all cells of the page have been received before deallocating that page.

FIG. 1 depicts a block diagram of an example network environment 100 with a network device 110. The network environment 100 includes a network 120 of interconnected network nodes 125. The network nodes 125 participate in the network 120 as data sources, data destinations or data sinks, and/or intermediary nodes such as switches, routers, and/or gateways propagating data from sources towards destinations through the network 120. The network 120 includes the network device 110 with links 127 to various other participating network nodes 125.

The network 120 can facilitate interactions between participant devices. Example networks include the Internet, a local network, a network fabric, or any other local area or wide area network. The network 120 can be composed of multiple connected sub-networks or autonomous networks. The network 120 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 120. The network can be public, private, or a combination of public and private. In general, the network 120 can be used to convey information between computing devices; for example, network nodes 125, and the network device 110.

The network device 110 can be a host device or server executing one or more virtual machines 130 on one or more processors of the network device 110. The network device 110 can include a network interface driver 140, a memory 150, a network interface card 160, a real operating system (OS) 170, a hypervisor 180, and the virtual machines 130. The network device 110 can communicate with other network devices over the network 120. The network device 110 and other network devices can create or participate in one or more virtual networks to facilitate communication between virtual machines 130. The one or more virtual networks can overlay the physical network that makes up the network 120. Data packets can be routed within one of the virtual networks overlaying the physical network using a system of data packet encapsulation. The network device 110 and the network nodes 125 can route the data packets according to virtual Internet protocol addresses (VIPs) and MAC addresses. In some examples, the network device 110 can host one or more virtual machines 130 that transmit data packets or receive data packets. In other examples, the network device 110 can be an intermediate node of a path between two virtual machines executing on two separate network devices. Accordingly, the network device 110 can act as a source, destination, or intermediate switch in one or more virtual networks.

The hypervisor 180 can manage operation of the virtual machines 130, including spinning up and terminating the virtual machines 130, managing allocation of memory 150 to the virtual machines 130, and live migrating the virtual machines 130 to other network devices.

The memory 150 can store data and/or computer executable instructions related to the operation and use of the network interface driver 140. The memory 150 can include a high bandwidth memory (HBM), a dynamic random access memory (DRAM), a synchronous dynamic random access memory (SDRAM), a static random access memory (SRAM), and/or a flash memory, as examples. The memory 150 can be allocated in granularity of cells for storing received data packets as well as data packets for transmission. For example, the memory 150 can include cells of sizes 256B, 512B, or 1 KB, with support for up to 512K cells. The data packets can include a single control cell and a plurality of data cells. The control cell can store metadata for the data packet. The data packet can be allocated to multiple data cells based on the size of the data packet. While shown outside the network interface card 160 in FIG. 1, the memory 150 can also be included within the network interface card 160, depending on the implementation.

The memory 150 can store computer executable instructions of a transport protocol module 175, such as a transmission control protocol (TCP) module or the TCP layer of a network stack, to be executed on a processor of the network device 110. While shown in the network interface card 160, the transport protocol module 175 can also be included in the real OS. Functionality occurring within a TCP layer of a network stack can be additionally or alternatively executed in another network protocol module within the transport layer, the network layer, or a combined transport/network layer of a network stack. For example, the functionality can be implemented in a user datagram protocol (UDP) module, reliable datagram protocol (RDP) module, reliable user datagram protocol (RUDP) module, or a datagram congestion control protocol (DCCP) module. A network layer, a transport layer, or a combined transport/network layer can generally be referred to as a packet layer of a network stack.

The network interface driver 140 can include a network interface driver software module running on the real OS 170. As an example, the network interface driver 140 can be a collection of computer executable instructions stored in the memory 150 that when executed by a processor help facilitate network communications. As another example, the network interface driver 140 can be implemented as logic in a hardware processor or other integrated circuit, or as a combination of hardware and software logic. The network interface driver 140 can communicate with one of the software virtual machines 130 directly or via a guest OS of the virtual machine 130 and/or the hypervisor 180.

The network interface driver 140 can be included within a layer of a network stack of the real OS 170 of the network device 110. In an example, the network interface driver 140 can be included within a data link layer of a network stack and can communicate with a software module or application that is included in an application layer of the network stack. In another example, the network interface driver 140 can be included within a link layer of a network stack and can communicate with a TCP/IP module that is included in an internet/transport layer of the network stack. In other examples, the functionality occurring within the layer of the network stack can additionally or alternatively be configured to receive packets from another network or transport layer protocol module, such as a UDP module, RDP module, RUDP module, or a DCCP module. While not shown, the network interface driver 140 can be included as a portion of the network interface card 160.

The network interface card 160 can be configured to transfer data packets over a network protocol, such as a layer 2 protocol. The network interface card 160 can include a packet forwarder 162, a memory allocator 164, and a memory 166.

The memory 166 can store data and/or computer executable instructions related to the operation and use of the network interface card 160. For example, the memory 166 can store sub-allocators and summary vectors for determining cell availability. The memory 166 can include a SRAM, HBM, DRAM, SDRAM, and/or a flash memory, as examples.

The packet forwarder 162 can be implemented in an application-specific integrated circuit (ASIC) or as software executing on a microprocessor. The packet forwarder 162 can receive data packets for transmission from the virtual machines 130 and route them to one or more destination virtual machines executing on remote network devices. The packet forwarder 162 can also perform functions that allow the network interface card 160 to act as a destination for data packets received over the links 127. For example, the packet forwarder 162 can receive a data packet over one of the lines 127, decapsulate the data packet, and forward the data packet to one or more destination virtual machines 130 executing on the network device 110. The packet forwarder 162 can transmit and receive data packets based on the connection entries stored in the cache 166. Each transmission or reception of a data packet can correspond to deallocation or allocation of the memory 150, respectively.

The memory allocator 164 can be implemented in an application-specific integrated circuit (ASIC) or as software executing on a microprocessor. The memory allocator 164 can respond to allocation requests and deallocation requests. For allocation requests, the memory allocator 164 can search for available entries in sub-allocators of the memory 166 based on summary vectors and store a data packet from the allocation request accordingly in the memory 150. For deallocation requests, the memory allocator 164 can remove the data packet from the memory 150 and update the sub-allocators and summary vectors in the memory 166 accordingly.

Figure 2:
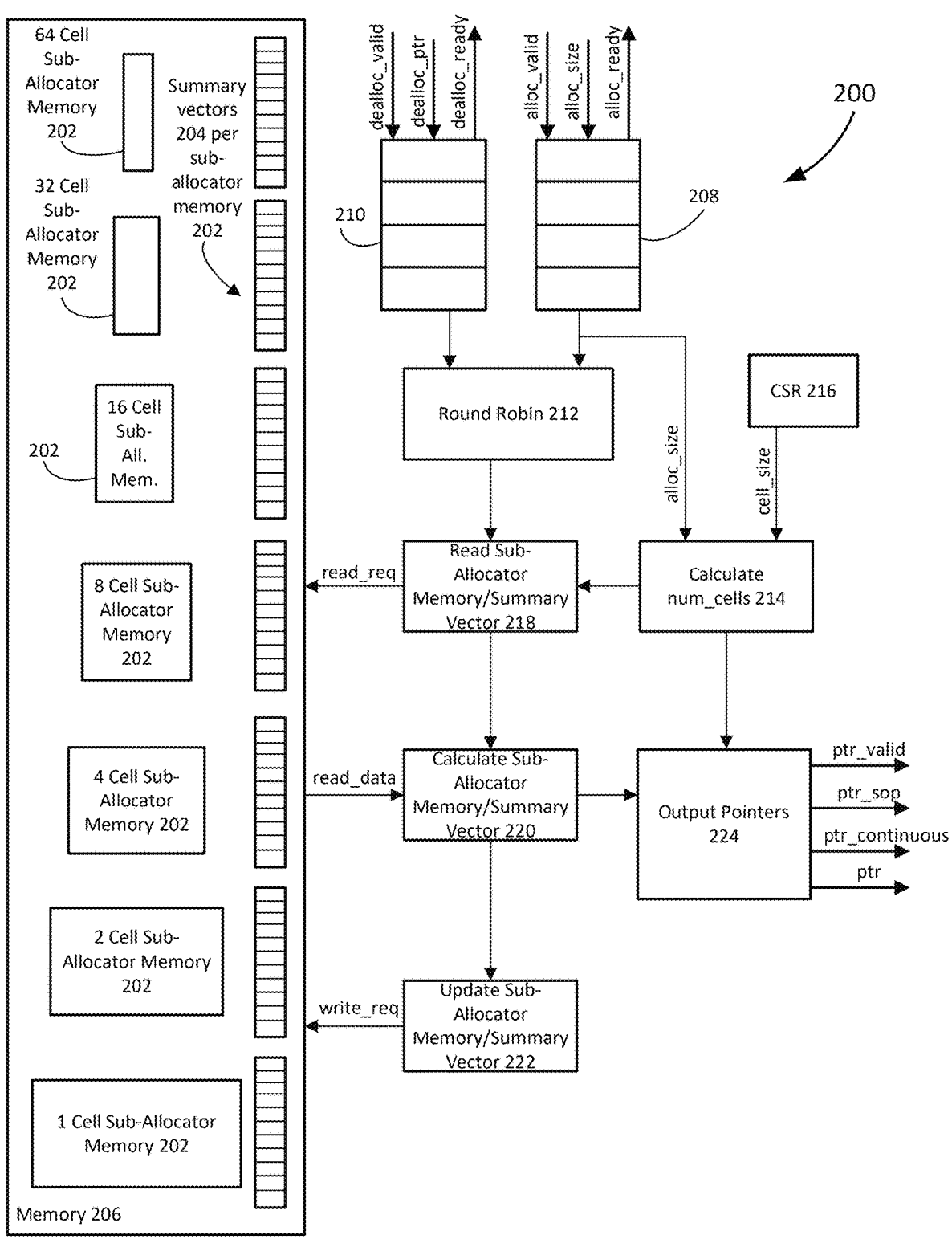
FIG. 2 depicts a block diagram of an example memory allocator to assign or remove contiguous memory space for data packets according to aspects of the disclosure.

FIG. 2 depicts a block diagram of an example memory allocator 200 to assign contiguous memory space for storing data packets. The memory allocator 200 can correspond to the memory allocator 164 as depicted in FIG. 1. The memory allocator 200 can assign contiguous memory space based on a plurality of sub-allocator memories 202 and corresponding summary vectors 204. The sub-allocator memories 202 and summary vectors 204 can be stored in memory 206. The memory 206 can correspond to the memory 166 as depicted in FIG. 1. The sub-allocator memories 202 can be organized in decreasing size in the memory 206 based on the amount of memory quanta they can allocate. Organizing in decreasing size can decrease pointers needed for updating corresponding entries in sub-allocator memories 202 when allocating a received data packet, leading to a decrease in latency. Each sub-allocator memory 202 can include a structure of entries, such as a 2-dimensional structure of rows and columns, where each entry represents a quanta of memory allocation. Each entry can correspond to a bit, as an example. While FIG. 2 depicts 7 sub-allocator memories 202, any number of sub-allocator memories 202 can be included in the memory 206. Further, while FIG. 2 depicts the sub-allocator memories 202 related by powers of 2, the sub-allocator memories 202 can be related by any number power or arbitrarily configured.

The memory allocator 200 is configured to attempt to allocate all cells for a data packet in a continuous address range. Allocating the cells in a continuous address range can eliminate the need to store an address for cells in a control cell of a stored data packet, which reduces fetch latency.

The memory allocator 200 can include an allocation queue 208 and a deallocation queue 210 for receiving allocation and deallocation requests, respectively. As an example, the allocation queue 208 and deallocation queue 210 can be first in first out (fifo) queues. The allocation queue 208 can receive an allocation request, including an indication the allocation is valid and an allocation size. The allocation requests can be queued in the allocation queue 208 until they are ready to be output, at which point the allocation queue 208 can send out an indication the allocation is ready. The deallocation queue 210 can receive a deallocation request, including an indication the deallocation is valid and a pointer address representing the data packet cells to be deallocated. The deallocation requests can be queued in the deallocation queue 210 until they are ready to be output, at which point the deallocation queue 210 can send out an indication the deallocation is ready.

Allocation and deallocation requests can be arbitrated by a round robin module 212, with an allocation or deallocation supported per cycle. For example, an allocation request can be supported in one cycle, then a deallocation request can be supported in the next cycle, and then an allocation request can be supported in the next cycle, with allocation requests and deallocation requests continuing to alternate per cycle. The round robin module 212 can ensure memory for storing data packets does not reach capacity too quickly nor is left empty.

The memory allocator 200 can allocate continuous cell pointers to represent incoming allocation requests. The continuous cell pointers can represent the number of cells required for an incoming data packet. A cell calculation module 214 can compute the number of cells, and thus the number of cell pointers, required for an incoming data packet. The cell calculation module 214 can compute the number of cells based on an incoming allocation request size and a cell size configuration. The cell size can be stored in a control status register (CSR) 216. For example, for a 4 KB allocation request and 256B cell size, 4 KB/256B=16 cells. Therefore, 16 continuous cell pointers can be allocated to represent the example incoming allocation request.

To assign the continuous cell pointers, the memory allocator 200 includes the plurality of sub-allocator memories 202. Each sub-allocator memory 202 can support a different number of continuous cells. For example, a 17 cell sub-allocator memory can allow for providing cell pointers to 17 continuous cells. Each sub-allocator memory 202 can store an entry for one set of continuous cells, where the entries can be structurally arranged. For example, each entry can correspond to a bit and the bits can be arranged in a column/row structure in each sub-allocator memory 202. Each sub-allocator memory 202 can have any size depth and width, such as 1K, 2K, or 4K entries for example depths and 512, 256, or 128 entries for example widths. The sub-allocator memories 202 can be organized in the memory 206 in decreasing size based on the amount of continuous cells each sub-allocator memory 202 can support.

For example, as depicted in FIG. 2, the memory allocator 200 can include 7 power-of-2 sub-allocator memories 202. The 1-cell memory can correspond to each entry referring to 1 continuous cell and can have a depth of 1K entries and width of 512K/1K=512 entries. The 2-cell memory can correspond to each entry referring to 2 continuous cells. For instance, if {row0, column0} is set to '1', then cell0 and cell1 are available for allocation. The 2-cell memory can have a depth of 1K entries and a width of 512K/(2*1K)=256 entries. The 4-cell memory can correspond to each entry referring to 4 continuous cells. For instance, if {row0, column0} is set to '1', then cell0, cell1, cell2, and cell3 are available for allocation. The 4-cell memory can have a depth of 1K entries and a width of 128 entries. The 8-cell memory, 16-cell memory, 32-cell memory, and 64-cell memory can be similarly configured.

The memory allocator 200 can further include the plurality of corresponding summary vectors 204 per sub-allocator memory 202. The summary vectors 204 can indicate which rows in their corresponding sub-allocator memory 202 have pointers available to be allocated. The summary vectors 204 can be stored in flops.

For example, as depicted in FIG. 2, the memory allocator 200 can include 7 summary vectors 204 to correspond to the 7 sub-allocator memories 202. A 64 entry summary vector can indicate which rows have 64 continuous cells available, a 32 entry summary vector can indicate which rows have 32 continuous cells available, and a 16 entry summary vector can indicate which rows have 16 continuous cells available. The 8 entry, 4 entry, 2 entry, and 1 entry summary vectors can similarly indicate which rows have continuous cells available.

As reset or start, all entries in the all the sub-allocator memories 202 can be set as being available for allocation, such as by setting all bits as '1'. An entry can be indicated as available by setting a bit corresponding to that entry to '1' and an entry can be indicated as unavailable by setting a bit corresponding to that entry to '0'. To support lower than maximum cell allocation, a predetermined number of entries less than the total number of entries in all the sub-allocator memories 202 can be set as being available for allocation. The predetermined number of entries can be stored in a CSR (not shown).

From the round robin module 212, an incoming request for a data packet is received to assign a number of continuous pointers. The memory allocator 200 can attempt to find the best possible match for the request via a read sub-allocator memory/summary vector module 218. The read module 218 first looks at the summary vector 204 that matches the number of continuous pointers in the request to find a row which has that number of continuous pointers available. If there are none available, as indicated by the corresponding summary vector 204, the memory allocator 200 can enter a non-continuous mode and assign non-continuous pointers in the incoming request using the lowest available sub-allocator memory 202, such as the 1 cell sub-allocator memory. If one or more rows are available, the memory allocator 200 can select a row by finding the first available entry in the summary vector 204. The first available entry in the summary vector 204 can correspond to a lowest cell sub-allocator memory 202. The read module 218 can read the sub-allocator memories 202 for the selected row to select the first available entry in the selected row to provide addresses for the number of continuous pointers. The memory allocator 200 can mark the selected entry as unavailable via an update sub-allocator memory/summary vector module 222.

The memory allocator 200 can also compute corresponding entries for other sub-allocator memories 202 via a calculate sub-allocator memory/summary vector module 220. For example, the calculate module 220 can convert the selected entry into a 1-cell column value and then divide that value by the sub-allocator memory size. The update module 222 can mark those entries as unavailable as well. The calculate module 220 can recompute the row summary entries in the summary vectors 204 for all sub-allocator memories 202 and the update module 222 can reset any entries if required. The data packet is then stored in memory and the continuous pointers are output 224. The output pointers 224 can include an output valid pointer indicating the output is valid, a first pointer for the packet, a continuous pointer to indicate the allocator was able to assign continuous pointers for the packet, and the pointers themselves.

According to one example, an incoming request may request to assign 16 continuous pointers. The memory allocator 200 first looks at the 16 entry summary vector 204 to find a row in one of the sub-allocator memories 202 which has 16 continuous pointers available. If the 16 entry summary vector 204 indicates none are available, the memory allocator 200 enters a non-continuous mode and assigns all pointers using a 1 cell memory. If the 16 entry summary vector 204 indicates that a row is available, the memory allocator 200 can select a row by finding the first available bit in the 16 entry summary vector 204 indicated by a '1'. The memory allocator 200 can read the sub-allocator memories 202 for the selected row to find the first available bit in the 16 bit allocated row, indicated by a '1', which can provide addresses for the 16 continuous pointers. The memory allocator 200 can mark the corresponding bit as unavailable in the 16-bit allocator memory 202. The memory allocator 200 can also compute the corresponding bits for the other sub-allocator memories 202 and mark those as unavailable as well. The memory allocator 200 can recompute the row summary bits in the summary vectors 204 for the sub-allocator memories 202 and reset any bits if needed.

From the round robin module 212, an incoming deallocation request for a data packet can be received with a cell address to be deallocated. The read module 218 can determine the row and column for deallocation based on the received cell address. The update module 222 can mark the entry in the sub-allocator memory 202 corresponding to the determined row and column as available. The calculate module 220 can also compute any corresponding entries for all other sub-allocator modules, for example by multiplying the column value with the sub-allocator memory size. The update module 222 can also mark those corresponding entries as available. The calculate module 220 can recompute the row summary entries in the summary vectors 204 for all the sub-allocator memories and the update module 222 can reset any entries if required. The data packet can then be removed from memory.

Figure 3:
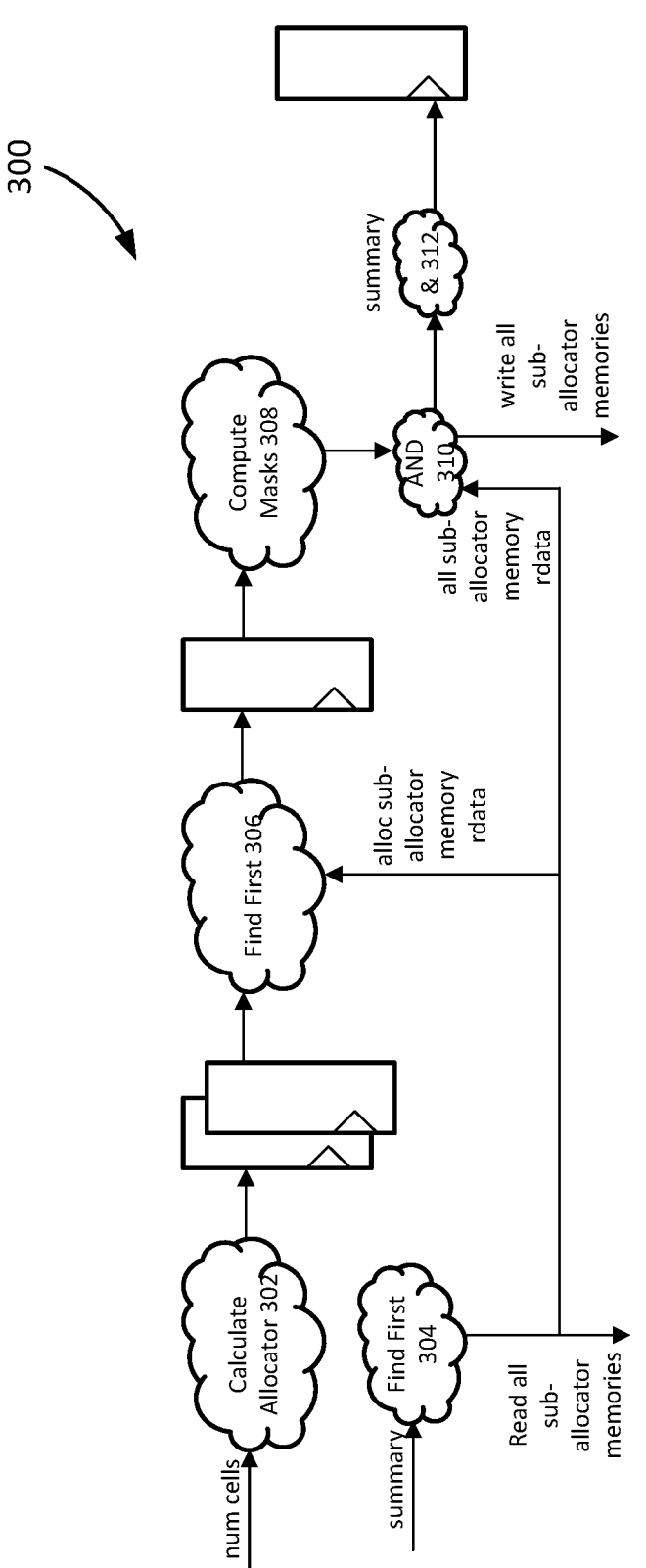
FIG. 3 depicts a block diagram of an example hardware allocation pipeline according to aspects of the disclosure.

FIG. 3 depicts a block diagram of an example hardware allocation pipeline 300 for allocation using flops and combinatorial logic. As depicted in FIG. 3, the combinatorial logic is illustrated by clouds. The allocation pipeline can be performed by one or more processors, in one or more locations, such as the memory allocator 200 as depicted in FIG. 2.

A calculate allocator module 302 can receive a computed number of cells corresponding to the continuous cell pointers to represent an incoming allocation request in order to determine the sub-allocator memory that matches the number of continuous cell pointers. A first find first module 304 can determine a first available row in the sub-allocator memory based on the first available entry in the summary vector. A second find first module 306 can determine a first available entry in the sub-allocator memory based on the determined first available row. Based on the determined entry, a compute mask module 308 can generate a mask to mark the determined entry as unavailable. Corresponding entries in other sub-allocator memories and summary vectors can be updated and marked accordingly as well based on an AND module 310 for corresponding entries and an & module 312 for summary vectors. As depicted in FIG. 3, the "AND" corresponds to an AND operation of two input signals while the "&" corresponds to a bitwise AND operation of a single input.

FIG. 4 depicts a flow diagram of an example process 400 for allocating memory for an incoming data packet. The example process 400 can be performed on a system of one or more processors in one or more locations, such as the memory allocator 200 as depicted in FIG. 2.

As shown in block 410, the memory allocator 200 can receive an allocation request to assign a number of continuous pointers. As shown in block 420, the memory allocator 200 can determine whether there are available entries in the sub-allocator memory that correspond to the number of continuous pointers in the allocation request. The memory allocator 200 can read the summary vector that matches the number of continuous pointers in the allocation request to find a row which has that number of continuous pointers available.

As shown in block 430, based on determining there are available rows, the memory allocator 200 can select a first available row in the sub-allocator memory that corresponds to the number of continuous pointers in the allocation request. The memory allocator 200 can find the first available entry in the summary vector to determine the first available row. As shown in block 440, the memory allocator 200 can select a first available entry in the selected row, which can provide addresses for the number of continuous pointers in the allocation request. As shown in block 450, the memory allocator 200 can mark the selected entry as unavailable.

As shown in block 460, the memory allocator 200 can determine corresponding entries to the selected entry in other sub-allocator memories. For example, the memory allocator 200 can convert the selected entry into a 1-cell column value and then divide that value by the sub-allocator memory size. As shown in block 470, the memory allocator 200 can mark the corresponding entries as unavailable as well.

Figure 5:
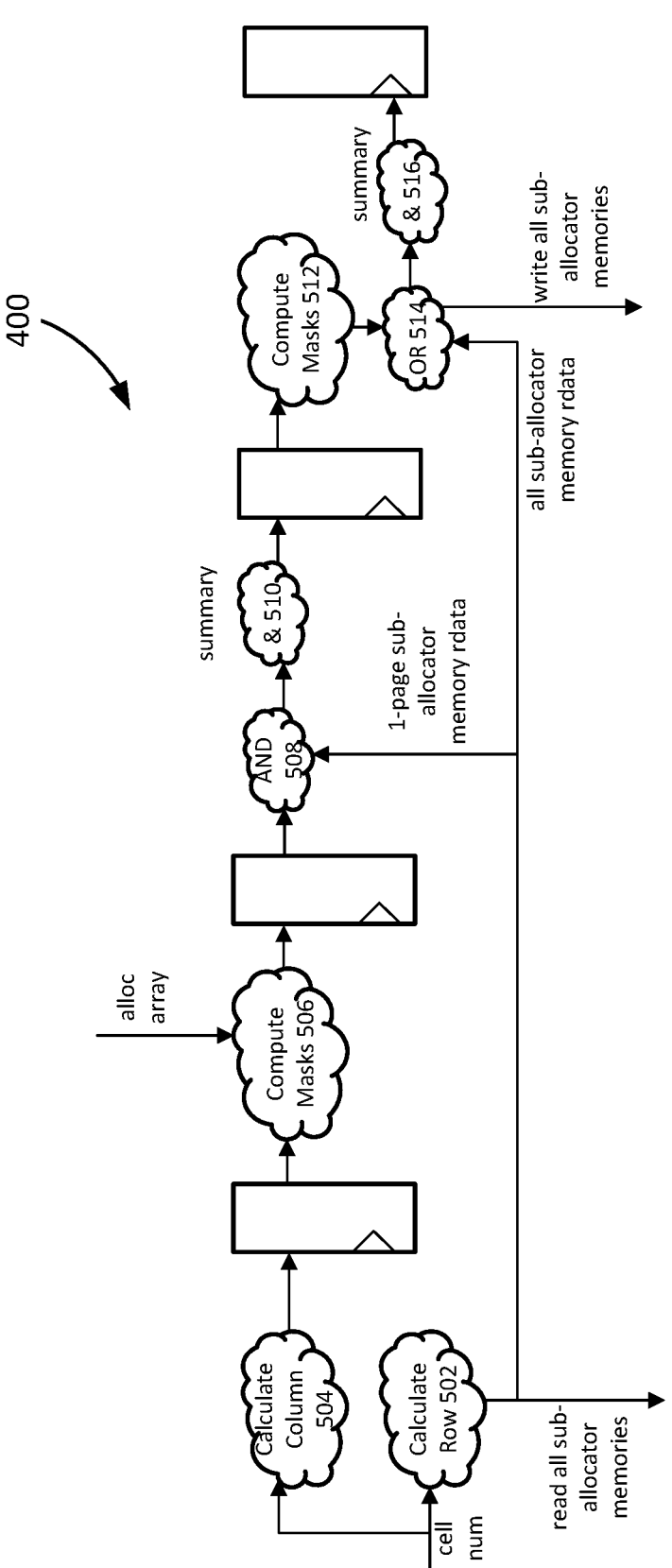
FIG. 5 depicts a block diagram of an example hardware deallocation pipeline according to aspects of the disclosure.

FIG. 5 depicts a block diagram of an example hardware deallocation pipeline 500 for deallocation using flops and combinatorial logic. As depicted in FIG. 5, the combinatorial logic is illustrated by clouds. The deallocation pipeline can be performed by one or more processors, in one or more locations, such as the memory allocator 200 as depicted in FIG. 2.

Based on a received cell address for an entry, a row and column of a sub-allocator memory can be determined for the entry via row calculate and column calculate modules 502, 504, respectively. Based on the determined column, a compute mask module 506 can generate a mask to mark the entry and corresponding summary vector as available. The compute mask module 506 can receive an allocation array corresponding to a size for each of the sub-allocators provided as an input to the compute mask module 506. Corresponding entries in other sub-allocator memories and summary vectors can be updated and marked as available accordingly as well via a second compute mask module 512 based on an AND module 508 and an & module 510. An OR module 514 can perform an OR operation with existing rows in the memory for each sub-allocator and a second & module 516 performs a bitwise AND of a resulting vector to compute the summary bit for the row. As depicted in FIG. 5, the "AND" corresponds to an AND operation of two input signals while the "&" corresponds to a bitwise AND operation of a single input.

Figure 6:
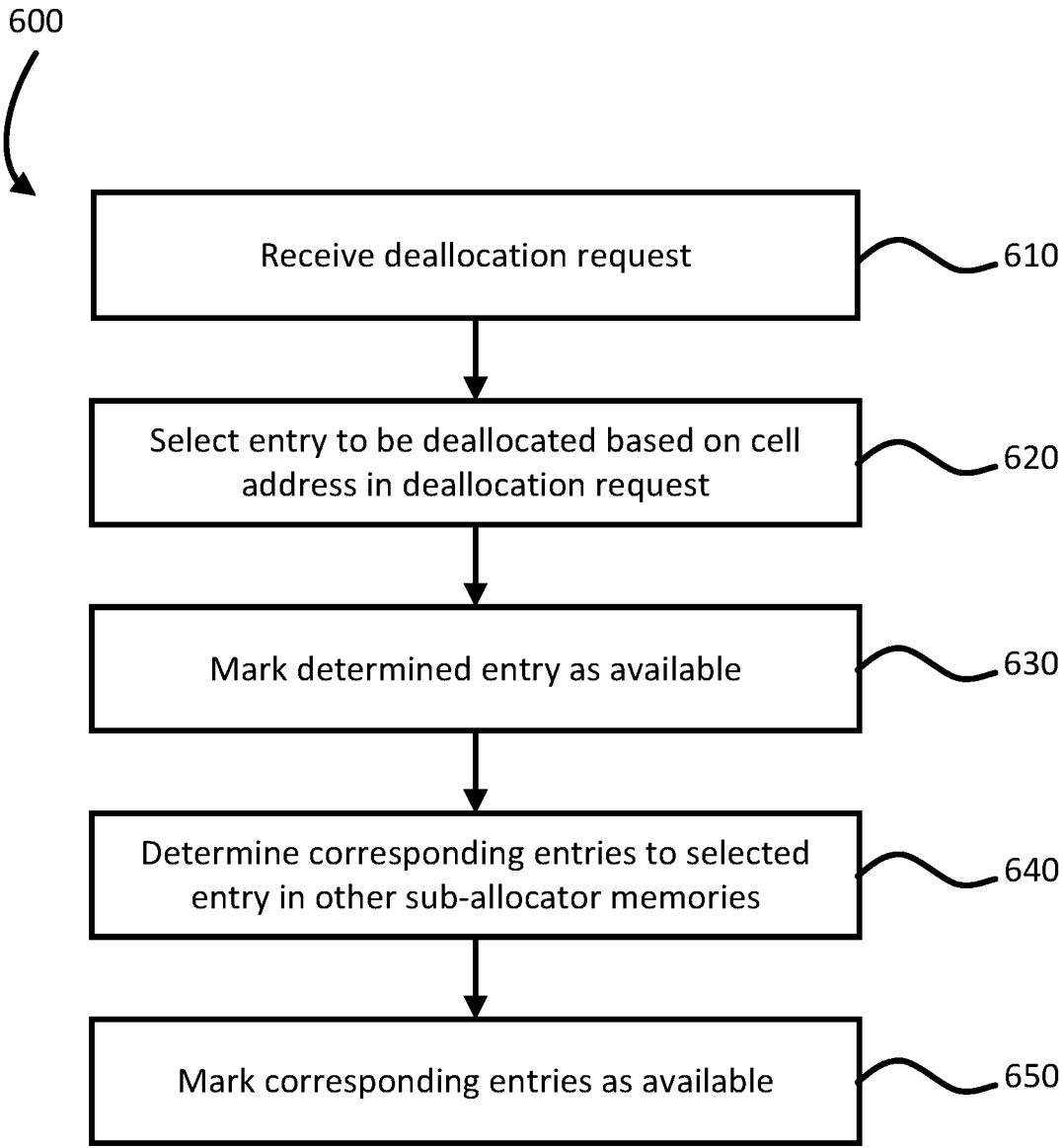
FIG. 6 depicts a flow diagram of an example process for deallocating memory for a data packet to be transmitted according to aspects of the disclosure.

FIG. 6 depicts a flow diagram of an example process 600 for deallocating memory for a data packet to be transmitted. The example process 600 can be performed on a system of one or more processors in one or more locations, such as the memory allocator 200 as depicted in FIG. 2.

As shown in block 610, the memory allocator 200 can receive a deallocation request to remove a number of continuous pointers. As shown in block 620, the memory allocator 200 can select an entry to be deallocated corresponding to the continuous pointers to be removed. The memory allocator 200 can determine a row and column for the selected entry based on a cell address in the deallocation request. As shown in block 630, the memory allocator 200 can mark the selected entry as available.

As shown in block 640, the memory allocator 200 can determine corresponding entries to the selected entry in other sub-allocator memories. For example, the memory allocator 200 can multiply the column value with the sub-allocator memory size. As shown in block 650, the memory allocator 200 can mark the corresponding entries as available as well.

Figure 7:
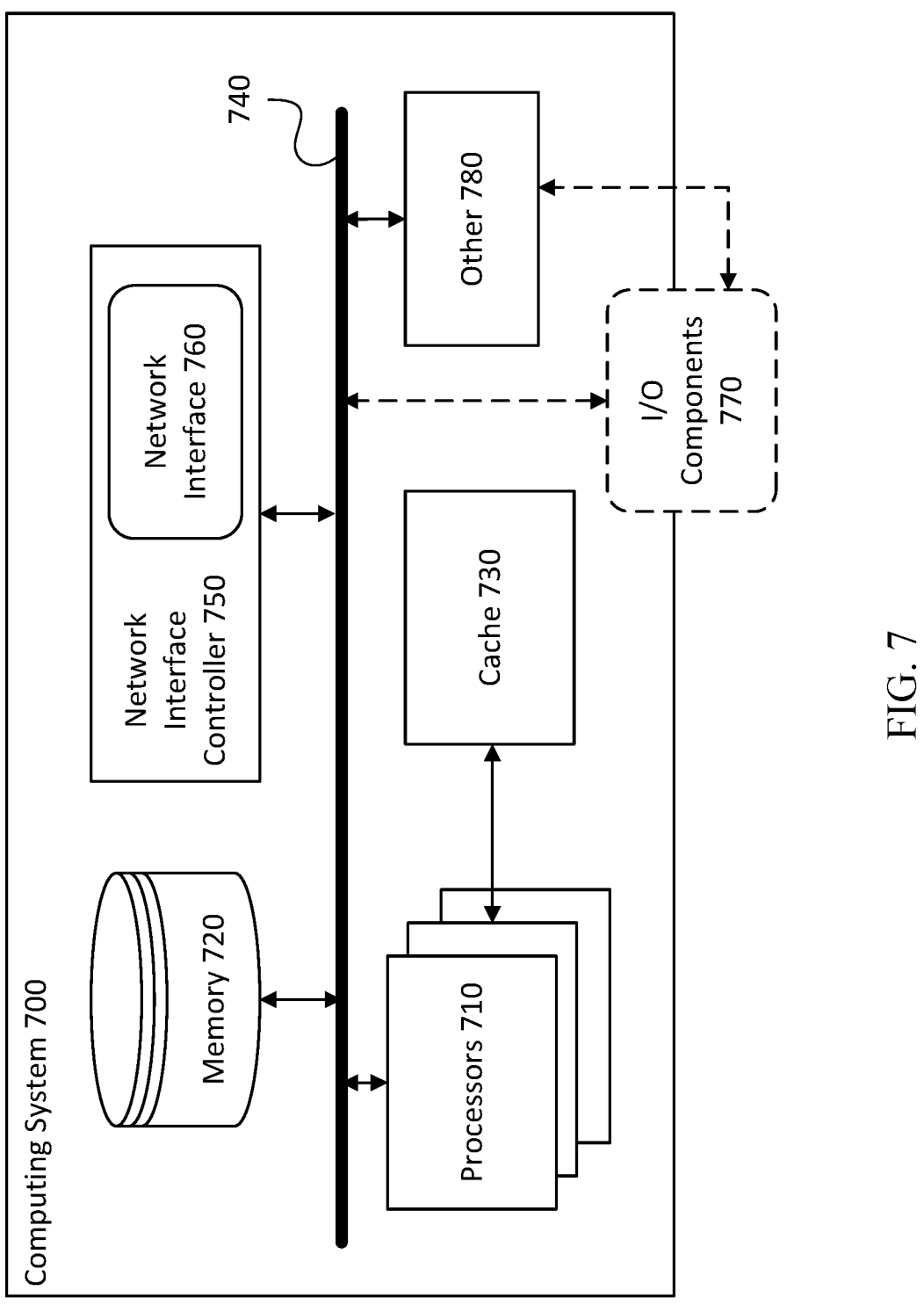
FIG. 7 depicts an example computing system according to aspects of the disclosure.

FIG. 7 depicts an example computing system 700, which can be configured as the network device 110 of FIG. 1. The computing system 700 can include one or more processors 710 in communication with memory 720, at least one network interface controller 750 with network interface port 760 for connection to a network, input/output (I/O) components 770, and other components 780. The processors 710 can be in communication with the memory 720, network interface controller 750, I/O components 770, and other components 780 via a bus 740, as an example. The processors 710 can incorporate, or are connected to, cache memory 730. In some instances, instructions are read from memory 720 into cache memory 730 and executed by the processors 710 from cache memory 730.

The processors 710 can be any logic circuitry that executes instructions fetched from the memory 720 or cache 730. The processors 710 can be microprocessor units or special purpose processors. The computing device 700 can be based on any processor, or set of processors, capable of operating as described herein. The processors 710 can be single core or multi-core processors. The processors 710 can be multiple distinct processors. The processors 710 can be implemented as circuitry on one or more chips.

The memory 720 can be any device suitable for storing computer readable data. The memory 720 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The computing system 700 can have any number of memory devices 720.

The cache memory 730 can be a form of computer memory placed in close proximity to the processors 710 for fast access times. The cache memory 730 can be part of, or on the same chip as, the processors 710. There can be multiple levels of cache 730, e.g., level 2 and level 3 cache layers.

The network interface controller 750 can manage data exchanges via the network interface 760. The network interface controller 750 can handle the physical and data link layers of the open systems interconnection (OSI) model for network communication. Some of the tasks of the network interface controller 750 can be handled by one or more of the processors 710. The network interface controller 750 can be incorporated into the processors 710, such as circuitry on the same chip.

The computing system 700 can have multiple network interfaces 760 controlled by a single controller 750 or multiple network interface controllers 750. Each network interface 760 can be a connection point for a physical network link, e.g., a cat-5 Ethernet link. The network interface controller 750 can support wireless network connections and an interface port 760 can be a wireless, e.g., radio, receiver/transmitter. The network interface controller 750 can implement one or more network protocols such as Ethernet. The computing system 700 can exchange data with other computing systems via physical or wireless links through a network interface 760. The network interface 760 can link directly to another device or to another device via an intermediary device, e.g., a network device such as a hub, a bridge, a switch, or a router, connecting the computing device 700 to a data network such as the Internet.

The computing system 700 can include, or provide interfaces for, one or more input or output (I/O) components 770. Input devices can include keyboards, microphones, touch screens, sensors, and pointing devices, such as a mouse or trackball, as examples. Output devices can include video displays, speakers, and printers, as examples.

Other components 780 can include an I/O interface, external serial device ports, and any additional co-processors. For example, the computing system 700 may include an interface, e.g., a universal serial bus (USB) interface, for connecting input devices, output devices, or additional memory devices, e.g., portable flash drive or external media drive. The computing device 700 can include an additional co-processor, such as a math co-processor to assist the processors 710 with high precision or complex calculations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for assigning contiguous memory space for data packets, comprising:
    receiving, with one or more processors, an allocation request to assign a number of continuous pointers to a sub-allocator memory of a plurality of sub-allocator memories that represent different quantas of memory allocation;
    searching, with the one or more processors, for an available entry in a summary vector that corresponds to an available row in a sub-allocator memory;
    selecting, with the one or more processors, a row in a sub-allocator memory based on a first available entry in the summary vector;
    selecting, with the one or more processors, a first available entry in the selected row to provide addresses for the number of continuous pointers; and
    marking, with the one or more processors, the selected entry as unavailable in the summary vector.

2. The method of claim 1, further comprising:
    determining, with the one or more processors, corresponding entries to the selected entry in other sub-allocator memories; and
    marking, with the one or more processors, the corresponding entries as unavailable.

3. The method of claim 2, further comprising resetting, with the one or more processors, entries in the summary vector based on the selected entry marked as unavailable and the corresponding entries marked as unavailable.

4. The method of claim 1, wherein the summary vector being searched matches the number of continuous pointers.

5. The method of claim 1, wherein the number of continuous pointers corresponds to a number of cells in a data packet.

6. The method of claim 1, further comprising determining, with the one or more processors, the number of continuous pointers to assign based on an incoming allocation request size and a cell size.

7. The method of claim 1, further comprising:
    receiving, with the one or more processors, a deallocation request to remove a pointer from an entry in a sub-allocator memory; and
    marking, with the one or more processors, the entry from which the pointer is being removed as available.

8. The method of claim 7, further comprising:
    determining, with the one or more processors, corresponding entries to the entry from which the pointer is being removed in other sub-allocator memories; and
    marking, with the one or more processors, the corresponding entries to the entry from which the pointer is being removed as available.

9. The method of claim 7, wherein allocation requests and deallocation requests are received in a round-robin fashion.

10. The method of claim 1, wherein the plurality of sub-allocator memories are arranged in decreasing size based on a number of continuous cells each sub-allocator memory can support.

11. A system comprising:
    one or more processors; and
    one or more storage devices coupled to the one or more processors and storing instructions that, when executed by the one or more processors, cause the one or more processors to perform operations for assigning contiguous memory space for data packets, the operations comprising:
        receiving an allocation request to assign a number of continuous pointers to a sub-allocator memory of a plurality of sub-allocator memories that represent different quantas of memory allocation;
        searching for an available entry in a summary vector that corresponds to an available row in a sub-allocator memory;
        selecting a row in a sub-allocator memory based on a first available entry in the summary vector;
        selecting a first available entry in the selected row to provide addresses for the number of continuous pointers; and
        marking the selected entry as unavailable in the summary vector.

12. The system of claim 11, wherein the operations further comprise:
    determining corresponding entries to the selected entry in other sub-allocator memories;
    marking the corresponding entries as unavailable; and
    resetting entries in the summary vector based on the selected entry marked as unavailable and the corresponding entries marked as unavailable.

13. The system of claim 11, wherein the summary vector being searched matches the number of continuous pointers.

14. The system of claim 11, wherein the number of continuous pointers corresponds to a number of cells in a data packet.

15. The system of claim 11, wherein the operations further comprise determining the number of continuous pointers to assign based on an incoming allocation request size and a cell size.

16. The system of claim 11, wherein the operations further comprise:
    receiving a deallocation request to remove a pointer from an entry in a sub-allocator memory;
    marking the entry from which the pointer is being removed as available;
    determining corresponding entries to the entry from which the pointer is being removed in other sub-allocator memories; and
    marking the corresponding entries to the entry from which the pointer is being removed as available.

17. The system of claim 16, wherein allocation requests and deallocation requests are received in a round-robin fashion.

18. The system of claim 11, wherein the plurality of sub-allocator memories are arranged in decreasing size based on a number of continuous cells each sub-allocator memory can support.

19. A non-transitory computer readable medium for storing instructions that, when executed by one or more processors, cause the one or more processors to perform operations for assigning contiguous memory space for data packets, the operations comprising:

receiving an allocation request to assign a number of continuous pointers to a sub-allocator memory of a plurality of sub-allocator memories that each represent different quantas of memory allocation;

searching for an available entry in a summary vector that corresponds to an available row in a sub-allocator memory;

selecting a row in a sub-allocator memory based on a first available entry in the summary vector;

selecting a first available entry in the selected row to provide addresses for the number of continuous pointers; and marking the selected entry as unavailable in the summary vector.

20. The non-transitory computer readable medium of claim 19, wherein the operations further comprise:

determining corresponding entries to the selected entry in other sub-allocator memories;

marking the corresponding entries as unavailable; and resetting entries in the summary vector based on the selected entry marked as unavailable and the corresponding entries marked as unavailable.

\* \* \* \* \*